(No Model.)
D. D. McKERNAN.
TRUCK.
No. 267,357. Patented Nov. 14, 1882.
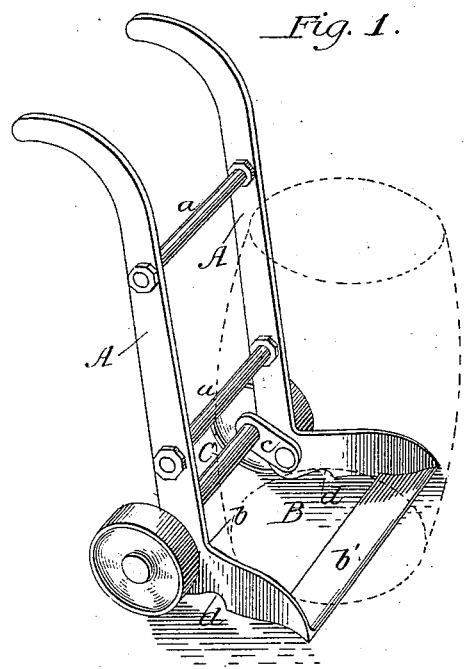
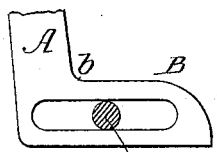
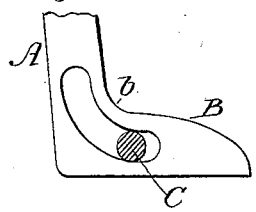
Witnesses:
Frank S. Blanchard
Geo. F. Fisher
Inventor:
Dennis D. McKernan
By Jno. G. Elliott
Attorney.

UNITED STATES PATENT OFFICE.

DENNIS D. McKERNAN, OF CHICAGO, ILLINOIS.

TRUCK.

SPECIFICATION forming part of Letters Patent No. 267,357, dated November 14, 1882.

Application filed November 16, 1881. (No model.)

*To all whom it may concern:*

Be it known that I, DENNIS D. MCKERNAN, a citizen of the United States, residing in Chicago, county of Cook, and State of Illinois, have invented certain new and useful Improvements in Trucks, of which the following is a specification.

My invention relates to trucks provided with a rigid toe-piece, which is slipped under the article to be loaded from the ground on the truck when the truck-platform is in approximately a vertical position; and the objects of my invention are to avoid handling barrels, boxes, &c., after they are once rested on the toe-piece; to load them on the trucks; to support the center of weight of said barrels, &c., over the axle of the platform or side bars of a truck when said platform is above a horizontal plane, so as to diminish the weight otherwise necessarily supported by the operator, and to maintain a barrel or box in an upright position when trundling it away. I attain these objects by devices illustrated in the accompanying drawings, in which—

Figure 1 is a perspective of a truck embodying my invention with the axle bearing against the under edges of the side pieces and the truck in position to push the toe-piece under the article preparatory to loading it; Fig. 2, a longitudinal section of the same with the bearing of the axle in the toe-piece beyond the end and in front of the upper edge of the side pieces; Fig. 3, a detail showing a modification of the bearings of the axle, and Fig. 4 a similar view of another modification.

Similar letters of reference indicate the same parts in the several figures of the drawings.

A A represent side bars, joined by rounds $a$ $a$ to form the truck-platform, and curved at their upper end to provide convenient handgrasps. These bars are bent at a right angle to their length, curved outwardly at $b$ $b$, and connected by a bar, $b'$, at their extremities and lower edge to form a toe-piece, B, for supporting the loaded article, which, when a barrel, rests on the bar $b'$ between the bars, and when a large box on the upper edges of the bars. Curving the side bars of the toe-piece and supporting a barrel below them on the bar $b'$ enables the carrying of a barrel having a greater diameter than the width of the truck and effectually prevents its rolling or sliding laterally when loaded.

Pivoted at the intersection of the side bars and toe-piece are links $c$ $c$, in the free end of which the axle C of the truck is journaled, the links forming a swing-frame for the axle, which in turn is the fulcrum of the truck.

The under edges of the toe-piece are recessed at $d$ $d$ to permit the axle to swing forward until in front of the upper edges of the side bars, and at the same time form a stop to prevent the axle swinging back when loading the truck, as will presently be explained.

It will be understood from the above that the axle has two bearings, one upon the side bars and the other upon the toe-piece, and that it may be shifted from one to the other at will, and that when in its forward bearing against the toe-piece the center of weight of a loaded barrel will be directly over the axle when the truck is in its operative position (see Fig. 2) to trundle the barrel away.

When the axle is in its forward bearing and the operator depresses the levers to lift the weight on the toe-piece the line of strain on the axle will be in a line through it and the pivot of the link. Hence the axle cannot slip out of the recesses $d$ $d$. The position of the trucks to shift a barrel or box on the toe-piece is that shown in Fig. 1—that is to say, the axle is raised to its bearing on the side bars, in which position the toe-piece is substantially flat on the ground, so that the barrel or box will be lifted but very little to push the toe-piece under it, after which the levers are pushed forward, as indicated in dotted lines in Fig. 2, and the axle pushed or swung forward by the foot of the operator to its bearing on the toe-piece. The long arm of the lever is thus increased and the short arm decreased, in view of which, and the fact that the toe-piece extends beyond the center of weight of the barrel, &c., the barrel may be lifted without handling and by the use of much less power than is required by the ordinary truck.

The same advantage may be gained by having a straight or curved slot in the bars and toe-piece forming the bearing of the axle, as shown in Figs. 3 and 4, respectively; and I therefore do not limit myself to the link-connection of the axle with the side bars to provide a truck with a shifting fulcrum; nor am I aware that a truck ever before had its axle-bearing at a point beyond the ends of and in a plane above the side bars.

Having thus described my invention, what I claim is—

1. In a truck, an axle having a shifting bearing, which bearing shifts from the side bars to the toe-piece, and vice versa, substantially as described.

2. In a truck, an axle having a shifting bearing, which bearing shifts from the side bars to a point beyond the ends of the same, substantially as described.

3. In a truck, an axle having a shifting bearing, which bearing shifts beyond the ends of and in a plane above the side bars, substantially as described.

4. The combination, with the side bars and toe-piece of a truck, of a swinging frame pivoted to the side bars, and an axle journaled in said frame, and having a bearing which shifts from the side bars to the toe-piece, and vice versa, substantially as described.

DENNIS D. McKERNAN.

Witnesses:
JNO. G. ELLIOTT,
WILLIAM C. WHITING.